United States Patent [19]
Swansiger

[11] Patent Number: 5,284,177
[45] Date of Patent: Feb. 8, 1994

[54] NON-RECLOSING PRESSURE RELIEF DEVICE FOR VACUUM SYSTEMS

[75] Inventor: William A. Swansiger, Livermore, Calif.

[73] Assignee: Sandia Corporation, Albuquerque, N. Mex.

[21] Appl. No.: 611,617

[22] Filed: Nov. 13, 1990

[51] Int. Cl.$^5$ .............................................. F16K 17/40
[52] U.S. Cl. ...................... 137/68.1; 220/89.3
[58] Field of Search ............ 137/68.1; 220/89.1, 220/89.2, 89.3

[56] References Cited

U.S. PATENT DOCUMENTS

| | | | |
|---|---|---|---|
| 1,951,897 | 3/1934 | Binckley | 137/68.1 X |
| 2,304,417 | 12/1942 | Mason | 220/89.3 |
| 2,707,398 | 5/1955 | Waite | 137/68.1 X |
| 3,742,968 | 7/1973 | Kennedy | 137/68.1 |
| 3,845,878 | 11/1974 | Carlson | 137/68.1 X |
| 4,049,221 | 9/1977 | Fountain | 137/68.1 X |
| 4,085,765 | 4/1978 | Nelson | 137/68.1 |
| 4,207,913 | 6/1980 | Fike, Jr. | 137/68.1 |
| 4,326,589 | 4/1982 | Ballman | 137/68.1 X |
| 4,364,487 | 12/1982 | Drumare | 137/68.1 X |
| 4,476,991 | 10/1984 | Voigtländer | 137/68.1 X |
| 4,512,491 | 4/1985 | DeGood et al. | 220/68.1 X |

OTHER PUBLICATIONS

Fike Metal Products Corporation, Forms No. D3010-5 Dated Feb. 1986 and B9018-2 undated.
Fike Metal Products Technical Bulletin TB8100, undated.
Fike Metal Products Corporation, Form No. B9020-4, undated.
Fike Metal Products Corporation, Data Sheet 3020 dated Oct. 1983 and Form No. M2002-1, undated.
Fike Metal Products Corporation, Form No. B9027-2, undated.

*Primary Examiner*—John Rivell
*Attorney, Agent, or Firm*—George H. Libman

[57] ABSTRACT

A non-reclosing overpressure protection device such as a rupture disc provides a non-reclosing opening upon forcible contact with a knife blade. A bellows, having an inlet capable of being sealably connected to a source of pressure (the vacuum system) and an outlet containing the rupture disc, transmits the pressure in the system to the disc. The bellows maintains the disc away from the knife when the pressure is below an overpressure amount, and carries the disc to a position when the pressure is above an overpressure amount where the disc is ruptured by the knife.

14 Claims, 3 Drawing Sheets

NON-RECLOSING PRESSURE RELIEF DEVICE FOR VACUUM SYSTEMS

The United States Government has rights in this invention pursuant to Contract No. DE-AC04-76DP00789 between the Department of Energy and American Telephone and Telegraph Company.

BACKGROUND OF THE INVENTION

This invention is directed to the field of overpressure relief devices for vacuum systems, and, more particularly, to overpressure devices that rupture when a vacuum system is pressurized.

A typical vacuum system easily tolerates a higher pressure on the outside than the inside (negative pressure), but is susceptible to damage when there is a higher pressure on the inside than the outside (positive pressure). In many systems, even a small amount of positive pressure may cause damage to expensive equipment, such as manipulators, connected to a vacuum system. Accordingly, where possible vacuum systems often incorporate pressure relief devices to vent the system if the internal pressure exceeds a predetermined amount, which amount may be as little as 1 psig.

Overpressure for vacuum systems is most likely to occur when systems are connected to an external source of gas used for known reasons such as purging, chemical vapor deposition, or sputter cleaning. Some internal gas sources, such as cryopumps and uranium hydride beds, can also release enough gas to overpressurize a vacuum system.

An effective pressure relief device for a vacuum system must meet several criteria. Most importantly, it must be able to resist the negative pressure the system is designed to undergo during normal vacuum operations. On the other hand, without any operator interaction, it must also reliably vent the system when the positive pressure exceeds a predetermined value. The device must also be impervious to corrosive chemicals which may be used within the system.

U. S. Pat. No. 4,512,419 of DeGood et al. discloses a rupture disc, one conventional pressure relief device. The design principle employed in a rupture disc to ensure predicable bursting pressures is simply a tension failure of the single metal membrane of the disc, the overpressure escaping through the ruptured disc. The design problem for a rupture disc is making it strong enough to resist negative pressure, and weak enough to fail at a predetermined positive pressure.

The reverse acting rupture disk is another overpressure device where a diaphragm has a bulging surface pulled by the negative pressure towards the interior of the vacuum system. In the event of overpressure, the bulging surface is pushed outwardly, where it is pierced by a knife blade, causing the diaphragm to rupture.

A problem with rupture discs is that the size of the disc varies inversely with the rupture pressure. For example, one commercially available disc has a diameter of 24" to provide 4 PSIG overpressure protection. The large size and cost of such a disc limits its usefulness in many applications.

SUMMARY OF THE INVENTION

It is an object of this invention to provide a rupture disc assembly that inexpensively and reliably ruptures upon the application of low positive pressure to a vacuum system.

It is another object of this invention to provide a rupture disc assembly that carries a rupture disc against a knife blade.

It is a further object of this invention to provide a rupture disc assembly that uses a bellows actuated by positive pressure to rupture a disc.

Additional objects, advantages, and novel features of the invention will become apparent to those skilled in the art upon examination of the following description or may be learned by practice of the invention. The objects and advantages of the invention may be realized and attained by means of the instrumentalites and combinations particularly pointed out in the appended claims.

To achieve the foregoing and other objects, and in accordance with the purpose of the present invention, as embodied and broadly described herein, the present invention may comprise a non-reclosing overpressure protection device for a vacuum system including rupturable means for providing a non-reclosing opening upon forcible contact with rupturing means such as a knife blade. A hollow operating assembly having an inlet sealably connected to the vacuum system includes an expansible wall having a first end extending from the inlet and an opposed, movable, second end. An outlet that is sealed by the rupturable means is carried by the second end from a first position when the wall is in an expanded condition. The wall is held in an unexpanded condition when the vacuum system is under negative pressure, and it expands when the vacuum system is under very low positive pressure, such as about 0.1 psig. The rupturable means is spaced from the rupturing means when the outlet is in the first position and is ruptured by the rupturing means when the outlet is at the second position.

In one embodiment of the invention, the system pressure moves the rupture disc into contact with the blade; in another embodiment, the operating assembly trips an actuator which causes a knife blade to be driven into the disc.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1A:
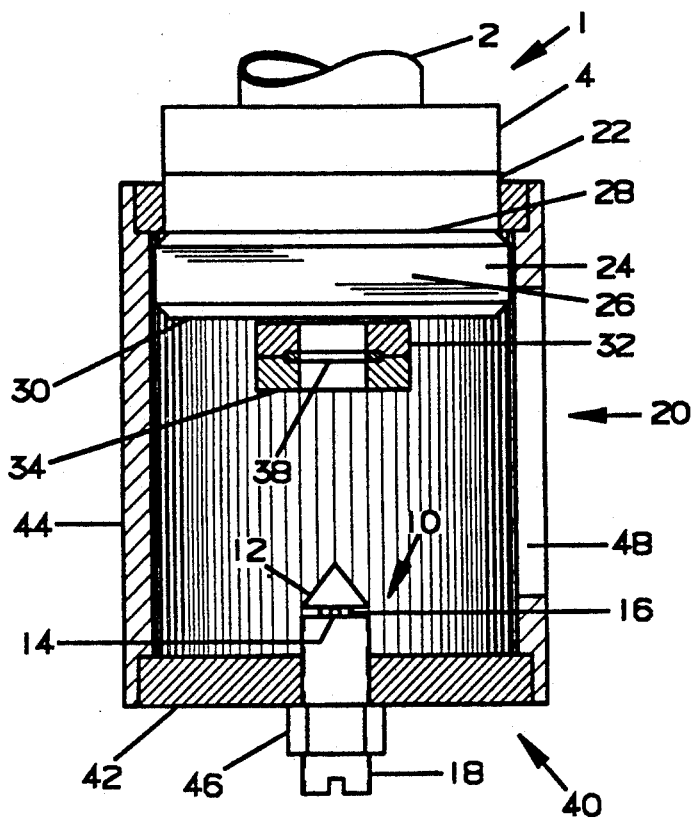
FIGS. 1A–1C show the changes that occur in a first embodiment of the invention during an overpressure event.
Figure 1B:
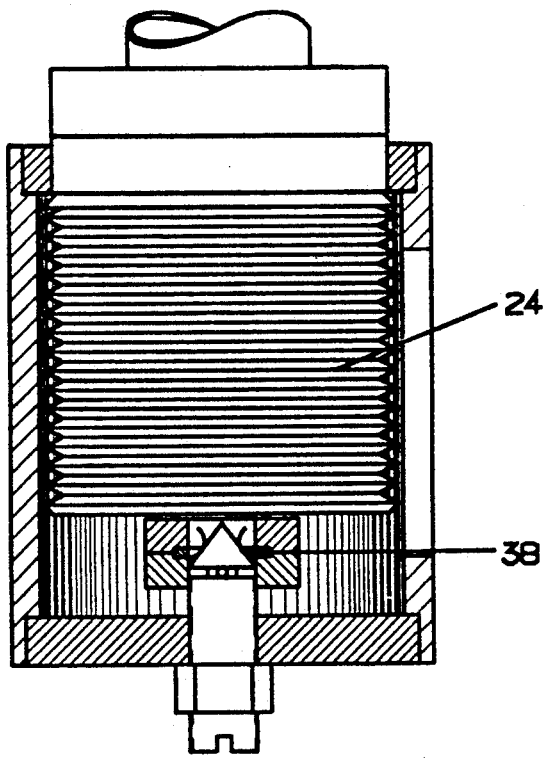
Figure 1C:
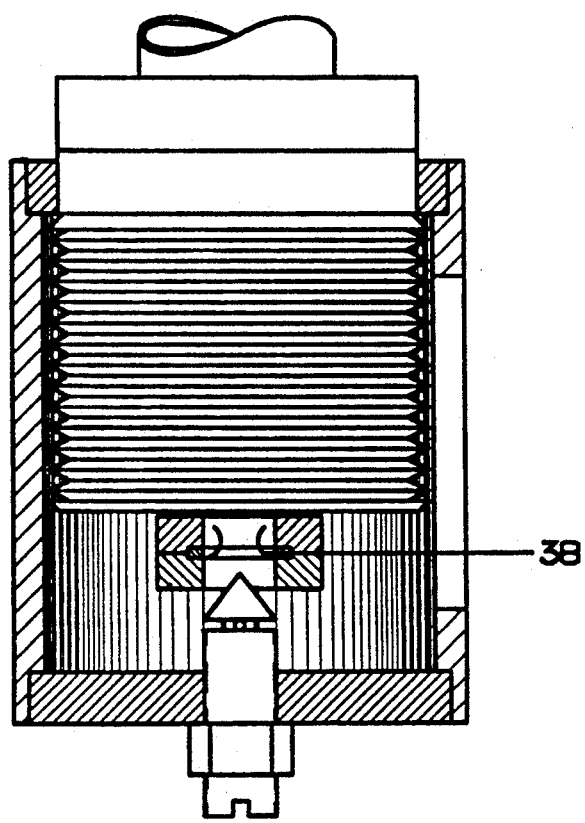

In accordance with a first embodiment of the invention, FIG. 1 shows an overprotection device 1 which includes an operating assembly 20, a rupturable means 38, a housing 40, and a rupturing means 10. Device 1 is operationally connected to a vacuum system (not shown) through an inlet pipe 2, which pipe may terminate in a conventional vacuum flange 4. As discussed hereinafter, FIG. 1A shows device 1 while the vacuum system is operating at a vacuum, FIG. 1B shows device 1 as positive pressure applied to the vacuum system causes operating assembly 20 to carry rupturable means 38 into rupturing contact with rupturing means 10, and FIG. 1C shows device 1 after the positive over pressure has been relieved through ruptured rupturable means 38.

Rupturable means 38 may be any object capable of sealing the output of operating assembly 20 under negative pressure, and rupturing when carried by operating assembly 20 into contact with rupturing means 10. In a preferred embodiment of the invention, rupturable means 38 consists of a thin metal membrane. For clarity, the term 'membrane' will be used hereinafter instead of 'rupturable means.'

Rupturing means 10 may be any object capable of rupturing membrane 38 when the membrane is moved into contact with rupturing means 10. In a preferred embodiment of the invention, rupturing means 10 is a knife blade assembly. For clarity, the term 'knife means' will be used hereinafter instead of 'rupturing means.' It should be understood that the use of each of these terms is merely for clarity, and it is not meant to limit the scope of the invention.

Device 1 may be connected to the vacuum system by the conventional attachment of inlet flange 22 to flange 4. Flange 22 is sealably connected to a first end 28 of expansible wall means 24. An outlet flange 32 is sealably connected to a second end 30 of expansible wall means 24. Membrane 38 seals the opening of outlet flange 32 and is held in place by retaining ring 34. The use of any known construction of flanges 4, 22, 32, and retaining ring 34 is contemplated that provides a vacuum coupling between the attached members so that the negative or positive pressure in the vacuum system is communicated to membrane 38. Conventional fastening means, such as screws (not shown), are preferably used to enable the coupled members to be decoupled by an operator.

Expansible wall means 24 must be impervious to the different types of gases which may pass through the vacuum system to which device 1 is connected. It also must be able to withstand high negative pressures when the vacuum system is operating, and respond quickly to positive pressures that are applied to device 1 by the vacuum system. Functionally, as shown in FIG. 1A, expansible wall means 24 must hold membrane 38 at a first position away from knife means 10 when the vacuum system is under negative pressure. In addition, as shown in FIG. 1B, when a positive overpressure of sufficient magnitude to activate the device is applied to the vacuum system, although the input end 28 of wall means 24 has not moved with respect to the vacuum system or knife means 10, output end 30 is moved by the positive overpressure to carry membrane 38 into rupturing contact with knife means 10.

In the preferred embodiment of the invention, expansible wall means 24 consists of an all-metal welded bellows, and, for clarity, will be referred to hereinafter as 'bellows 24.' Since bellows 24, sealed by membrane 38, collapses on itself under negative pressure to a minimum linear dimension, as shown in FIG. 1A, the invention easily is designed to not leak under negative pressure. Furthermore, since a given bellows has a constant spring rate, it is a routine matter for one skilled in the art to design bellows-based devices, covering a range of relief pressures and gas release rates, by varying the spring rate, the effective bellows area, and the number of bellows convolutions. A given bellows has a constant spring rate; therefore, the pressure at which a membrane will be ruptured may be adjusted by varying the distance between the membrane and the knife means while the system is at rest.

In other words, a principal advantage of the invention is that a bellows may be designed to expand a predetermined distance when subjected to a predetermined value of positive pressure. Also, this predetermined positive pressure may be a much lower value than would actuate other known rupture devices. However, this same bellows structure is inherently strong when subjected to negative pressure during normal operation of the vacuum device.

The use of other expandable wall means (not shown) is also contemplated in the practice of the invention. For example, membrane 38 could seal one end of a tube that cooperates in sliding relationship with another tube connected at an opposite end to inlet 4. Negative pressure would pull membrane 38 towards inlet 4; positive pressure would push it towards the knife assembly as shown herein. A practical problem with such an embodiment may be providing a vacuum seal between the sliding tubes that permits free movement under positive pressure.

Figure 2:
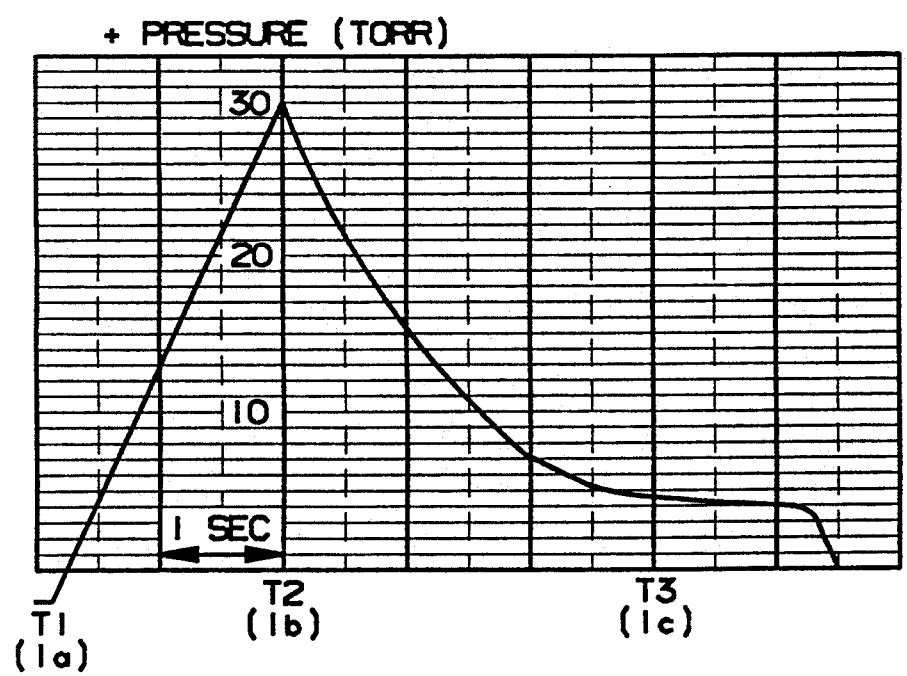
FIG. 2 shows the changes in pressure that occur during the overpressure event.

FIG. 2 is a plot of the pressure in the system as a function of time. In this example, stainless steel bellows 24 had 35 convolutions and dimensions of approximately 7.6 cm (3 inches) outside diameter and 5.5 cm (2.2 inches) inside diameter. Until time T1, the system was operated at negative pressure, and device 1 was in the position of FIG. 1A, with bellows 24 compressed to its minimum length of about 0.5 inch. At T1, gas was admitted to the system at the rate of 1 SCFM (standard cubic feet per minute). For the next two seconds, the pressure in the system increased linearly as the bellows expanded under the increasing positive pressure. At time T2, 0.6 PSIG), membrane 38 had been carried by bellows 24 approximately 3 cm (1.5 inches) into contact with knife means 10, as shown in FIG. 1B. At this time, the two crossed slits cut by the knife means resulted in an approximately 6 mm 0.25 inch) hole in the 2 cm (0.75 inch) diameter 0025 cm (0.001 inch) thick, stainless steel membrane 38. This rupture caused a rapid venting of the positive pressure. After another three seconds, at time T3, the pressure stabilized at a static level of 4 Torr (approximately 0.1 PSIG), which pressure was the result of the force of the applied gas on the torn membrane. The pressure trace returned to zero after the gas was turned off.

FIG. 1C shows device 1 after time T3. The natural springiness of the bellows causes membrane 38 to be retracted from knife means 10. This retraction is not to the position of the system at rest, as the reduced positive pressure shown at the end of FIG. 2 continues to be applied to bellows 24 from the device input. However, the retraction is advantageous to the operation of the device as the removal of knife means 10 from the opening in membrane 38 allows more gas to escape the system.

Knife means 10 is designed to reduce its resistance to the escape of pressure after membrane 38 has been ruptured. In particular, the design ensures that the knife blade assembly does not plug the hole that it cuts in the membrane, allowing the overpressure condition to continue.

In the preferred embodiment of the invention, a blade assembly 12 consists of two thin triangular metal blades affixed to each other at right angles along their centerlines. The lower edges of the metal blades mate with slots cut in the top edge 16 of blade holder 18, and roll pin 14 is placed through an aligned hole to keep blade assembly 12 fastened to holder 18. The cross blade design of assembly 12, in conjuction with hollow blade holder 18, ensures that overpressure is not relieved until membrane 38 has been driven sufficiently far into blade assembly 12 so that the top of blade holder 18 pushes elements of the cut membrane inwardly, allowing the overpressure to be vented through the hollow interior of holder 18.

Device 1 also preferably includes a cylindrical housing 40 surrounding bellows 24 and attached at one end to flange 28. The function of housing 40 is to provide protection for bellows 24 and to provide a mounting surface for knife assembly 10.

Housing 40 includes a cylindrical tube 44 extending from inlet flange 22, or some other structure fixed in relation to input end 28 of bellows 24. The opposite end of tube 44 includes a plate 42 or similar member that provides an opening aligned with membrane 38. Holder 18 of knife assembly 10 may be threaded into the opening in plate 42 for adjustment of the distance between blade 12 and membrane 38. This distance may be viewed through an opening such as slot 48 in housing 40. A locknut 46 may be threaded on holder 18 to enable the desired position to be locked by the operator.

To ensure a vacuum seal under high negative pressure, a copper gasket (not shown) may be brazed to the outer circumference of membrane 38 where it contacts outlet flange 32 and retaining ring 34.

Another advantage of this invention is that the disposable element, membrane 38, may merely be an inexpensive piece of metal film such as stainless steel, aluminum, or the like. The preferred embodiment, stainless steel, is easily torn as a result of contact with the knife, yet it is strong enough to withstand the normal operating environment of the system. For example, a membrane 38 similar to the one described above (which was burst by the knife assembly at 0.6 psig) required 360 psig to cause rupture due to tensile stress alone.

The preferred embodiment disclosed in FIG. 1 has been operated at positive pressures on the order of 0.5 PSIG. This level is a significant improvement over the values believed to be possible with other rupture devices. However, in some applications, venting of even lower values of positive pressure, or greater gas flow rates, is desired. Since the force with which bellows 24 carries membrane 38 into knife blade 12 is proportional to the positive pressure in the system, it is apparent that very low positive pressures may not move bellows 24 with sufficient force to cause a large enough rupture to vent the system before damage occurs.

The embodiment of FIG. 3 uses the operating assembly 20 of the embodiment of FIG. 1 to trip a spring-loaded knife assembly 60 to ensure rupture of membrane 38 at low positive pressures. This embodiment allows the use of a much larger knife blade assembly to tear a larger hole in the membrane, because the force generated by the spring can be much larger than the force generated by the expanding bellows under small positive pressure. Therefore, this embodiment protects systems from larger gas flow rates at lower pressures than existing devices, at the added cost of increased complexity and the reduced reliability caused by the need of an operator to ensure that the device is armed.

Figure 3A:
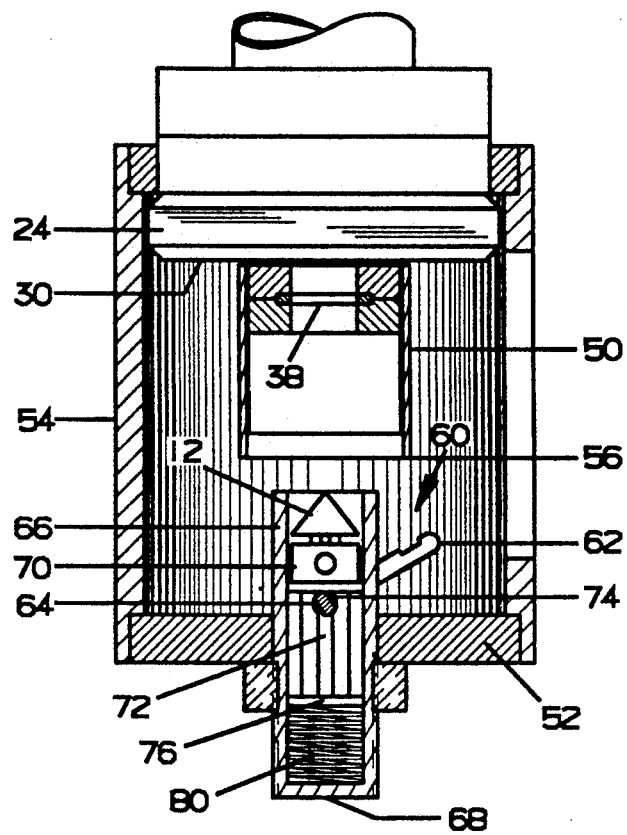
FIGS. 3A and 3B show a second embodiment of the invention before and after an overpressure event.

FIG. 3A shows this second embodiment under negative pressure. The physical arrangement of components of this embodiment is identical to the first embodiment, except housing 54 may be longer than housing 44 to enclose the additional structure of knife assembly 60 discussed hereinafter, and a trip cylinder 50, or equivalent structure, is fastened to output end 30 of bellows 24.

Knife assembly 60 includes a cylindrical tube 66 fastened to base plate 52 of housing 54. Tube 66 is closed at one end 68 facing away from membrane 38, and open at the opposite end. Knife blade assembly 12 is mounted as before at one end of a holder 70. The opposite end of holder 70 is a plate 76 or equivalent transverse structure which forms a surface for compressing a coil spring 80 against closed end 68 of tube 66. A slot 72 and knife blade assembly 12. A keyhole 74 having a diameter larger than the width of slot 72 is bisected by slot 72. A rectangular key 64 rotates around an axis transverse to slot 72. The width of key 64 is slightly smaller than the width of slot 72. The width of key 64 is slightly smaller than the width of slot 72; the length of key 64 is slightly smaller than the width of slot 72; the length of key 64 is slightly smaller than the diameter of the keyhole. A lever 62 attached at one end to key 64 causes key 64 to rotate.

In operation, as shown in FIG. 3A, knife assembly 60 is armed by pressing holder 70 against spring 80 until key 64 is aligned with keyhole 74. The outer end of lever 62 is then raised so the length dimension of key 64 is not aligned with slot 72. The width dimension of key 64 then abuts the junction of slot 72 with keyhole 74, preventing movement of holder 70 by spring 80.

Bellows 24 may be designed to carry membrane 38 towards knife assembly 12 under an overpressure as low as 0.2 PSIG. Even this low pressure is large enough to carry the lower edge 56 of cylinder 50 into operational contact with arm 62.

Figure 3B:
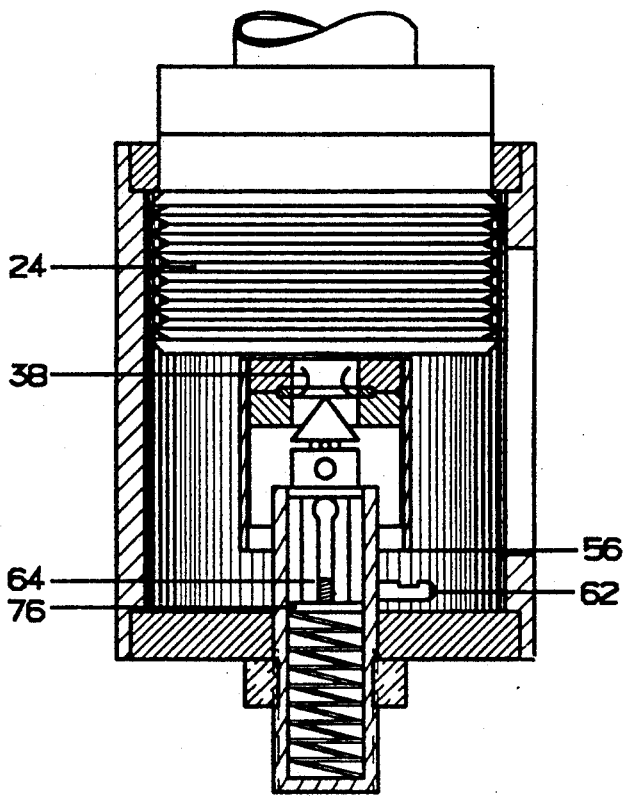

The result of this contact is shown in FIG. 3B. When arm 62 rotates under the slight force of edge 56, key 64 rotates until its length is aligned with slot 72. The stored energy of spring 80 is now able to push plate 76 and holder 70 toward membrane 38 until key 64 reaches the opposite end of slot 72. By properly sizing the length of slot 72 and cylinder 50, blade assembly 12 will forcefully rupture membrane 38. As in the first embodiment, the resulting loss of system pressure through the rupture allows the spring constant of bellows 24 to withdraw membrane 38 from the knife blade, as shown in the FIGURE.

A variation of the second embodiment (not shown) has the membrane mounted in the wall of the vacuum system instead of at an opposite end of the bellows. When lower edge 56 of cylinder 50 makes operational contact with an actuator, the blade assembly is driven by the spring into the membrane.

The particular sizes and equipment discussed above are cited merely to illustrate a particular embodiment of this invention. It is contemplated that the use of the invention may involve components having different sizes and shapes as long as the principle, having expansible means such as a bellows to cause rupturable means such as a metal membrane to be brought into contact with rupturing means such as a knife blade, is followed. It is intended that the scope of the invention be defined by the claims appended hereto.

I claim:

1. A non-reclosing overpressure protection device for a vacuum system, said device comprising:
   rupturable means for providing a non-reclosing opening upon forcible contact with rupturing means;
   rupturing means for rupturing said rupturable means; and a hollow operating assembly consisting of:
  an inlet sealably connected to said vacuum system;
  expansible wall means having a first end extending from said inlet and an opposed, movable, second end; and
  an outlet carried by said second end from a first position when said wall means is in an unexpanded condition to a second position when said wall means is in an expanded condition, said outlet being sealed by said rupturable means;
  said wall means being held in an unexpanded condition when said vacuum system is under negative pressure, and expanding when said vacuum system is under positive pressure greater than about 0.1 psig;
  said rupturable means being spaced from said rupturing means when said outlet is in the first position and ruptured by said rupturing means when said outlet is at the second position.

2. The device of claim 1 wherein said opposed end of said operating assembly defines an outlet for said pressure, said end being sealed by said rupturable means.

3. The device of claim 2 further comprising retaining means for releasably fastening said rupturable means to said operating assembly, whereby rupturable means ruptured by said rupturing means are readily replaceable.

4. The device of claim 2 wherein said rupturable means consists of a metal membrane.

5. The device of claim 4 wherein said rupturing means consists of a knife blade assembly.

6. The device of claim 1 wherein said wall means consists of an all metal welded, belows assembly, the interior volume of said operating assembly expanding upon application of an overpressure.

7. The device of claim 6 wherein said rupturable means comprises a metal membrane.

8. The device of claim 7 wherein said rupturing means is a knife blade assembly.

9. The device of claim 7 further comprising retaining means for releasably fastening said metal membrane to said operating assembly outlet.

10. The device of claim 6 wherein said inlet and said outlets each comprise a vacuum flange.

11. The device of claim 10 further comprising retaining means for releasably fastening said rupturable means to said outlet vacuum flange.

12. The device of claim 6 wherein said bellows has an outside diameter of approximately 5 cm, an inside diameter of approximately 4 cm, and a deflection rate of about 3 cm/psi.

13. The device of claim 12 wherein said rupturable means is a metal membrane of approximately 2 cm diameter.

14. The device of claim 1 wherein said rupturing means comprises:
  a knife blade assembly;
  shaft means for carrying said knife blade assembly from a first shaft position away from said rupturable means to a second shaft position towards said rupturable means;
  power means for causing, upon actuation, said shaft means to move from said first shaft position to said second shaft position;
  actuator means for actuating said power means, said actuator means being actuated by contact with said opposed end of said operating assembly; whereby said knife blade ruptures said rupturable means.

* * * * *